United States Patent [19]

Beck et al.

[11] 4,407,651

[45] Oct. 4, 1983

[54] HYBRID REHEATING SYSTEM AND METHOD FOR POLYMER PREFORMS

[75] Inventors: Martin H. Beck, Brookline; Suppayan M. Krishnakumar, Nashua, both of N.H.; Wayne N. Collette, Canton, Conn.

[73] Assignee: The Continental Group, Inc., Stamford, Conn.

[21] Appl. No.: 345,997

[22] Filed: Feb. 5, 1982

[51] Int. Cl.$^3$ .......................... F27D 3/00; F27B 9/14; F27B 9/06

[52] U.S. Cl. ..................... 432/11; 219/388; 373/1; 432/120; 432/124

[58] Field of Search ............... 219/388; 373/1; 34/4; 432/11, 124, 230, 120

[56] References Cited

U.S. PATENT DOCUMENTS

| | | | |
|---|---|---|---|
| 2,642,627 | 6/1953 | Mann et al. | 264/26 |
| 2,788,838 | 4/1957 | Crabbe et al. | 156/379.6 |
| 2,865,790 | 12/1958 | Baer | 427/45.1 |
| 2,900,665 | 8/1959 | Walker | 264/153 |
| 3,249,741 | 5/1966 | Mills | 432/11 |
| 3,320,397 | 5/1967 | Alexander et al. | 432/11 |
| 3,445,096 | 5/1969 | Seefluth | 432/11 |
| 3,584,389 | 6/1971 | Hilton et al. | 34/1 |
| 3,594,862 | 7/1971 | Seefluth | 432/124 |
| 3,639,190 | 1/1972 | Brooke et al. | 264/26 |
| 3,655,848 | 4/1972 | Young et al. | 264/521 |
| 3,715,109 | 2/1973 | Gilbert | 219/388 |
| 3,761,550 | 9/1973 | Seefluth | 264/25 |
| 3,786,221 | 1/1974 | Silverman | 264/27 |
| 3,787,170 | 1/1974 | Gilbert | 432/5 |
| 3,830,893 | 8/1974 | Steingiser | 264/25 |
| 4,079,104 | 3/1978 | Dickson et al. | 219/388 |
| 4,315,725 | 2/1982 | Yoshino | 219/388 |

*Primary Examiner*—John J. Camby
*Attorney, Agent, or Firm*—Charles E. Brown

[57] ABSTRACT

This relates to a heating system and process for reheating preforms prior to delivering the preforms to a blow molder. The heating system utilizes different types of heating units, one of which will heat the preform wall more highly at the interior surface and the other of which will heat the preform wall at the exterior surface. By effectively controlling the heat input to a preform from each heating unit and by controlling the outputs of the different heating units in combination, the desired temperature profile through the preform wall may be obtained substantially without any time in the oven being provided for heat equilibration and at the same time a maximum heating effort may be effected to produce the necessary heating of a preform within a minimal time and more uniformly than heretofore possible.

18 Claims, 20 Drawing Figures

| A | B | A |

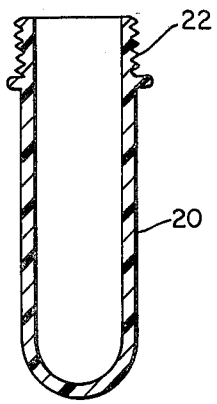
FIG. 1.
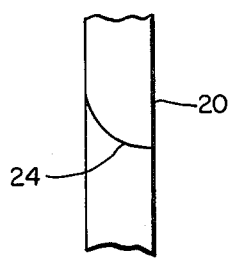
FIG. 2.
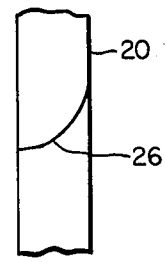
FIG. 3.
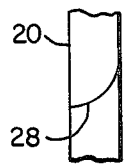
FIG. 4A.
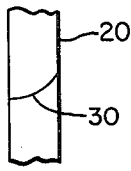
FIG. 4B.
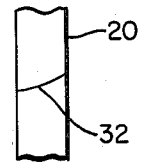
FIG. 4C.
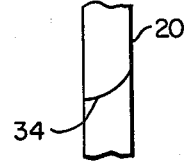
FIG. 5A.
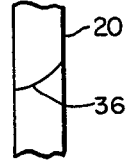
FIG. 5B.
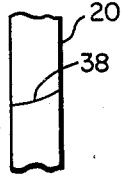
FIG. 5C.
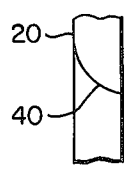
FIG. 6A.
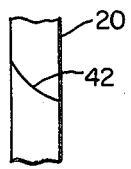
FIG. 6B.
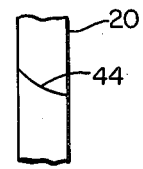
FIG. 6C.
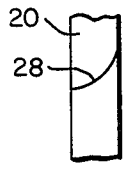
FIG. 7A.
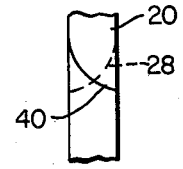
FIG. 7B.
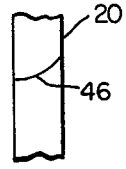
FIG. 7C.
FIG. 8.
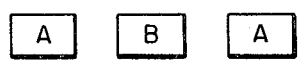
FIG. 9.
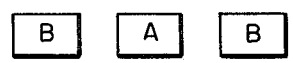
FIG. 10.
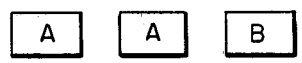
FIG. 11.
FIG. 12.

HYBRID REHEATING SYSTEM AND METHOD FOR POLYMER PREFORMS

This invention relates in general to new and useful improvements in blow molding systems and processes and more particularly to the reheating of preforms as an initial step in the blow molding operation.

It is customary to provide preforms of various types including injection molded preforms, extruded preforms and preforms formed from sheet material. Each of these preforms must be reheated to a proper blow molding temperature immediately before being placed within a blow mold.

It has been customary in the past sequentially to pass preforms through an oven wherein the preforms are either gradually heated over a long period of time to obtain the desired temperature throughout the wall of the preform or, in some instances, the preforms are slightly overheated and permitted to pass through an unheated or less heated area of the oven so that the temperature profile may reach an equilibrium. The net result of such an oven is that the heating time is very long, and therefore the oven must be of a very long length and, in the event of machine failure, a large number of preforms are lost. Further, with certain polymers, particularly polyethylene terephthalate, if there is an excessive overheating, crystallization may occur. Further, the exterior surface of the preform wall is heated to a higher temperature than the interior surface, whereas the desired temperature profile is the reverse.

In ovens of the type described above, the conventional heating elements are of the convection/conduction type and the heating source is normally either in the form of a Calrod or a quartz heater with suitable reflectors being utilized.

For certain types of polymers there has been developed microwave heaters, and there has recently been developed for heating polyesters such as polyethylene terephthalate radio frequency heaters. These heaters, generally classified as high frequency dielectric heaters, provide a reverse temperature profile from that of the Calrod and quartz heater types, with the interior surface of the preform wall being heated to a higher temperature than that of the exterior surface. With this type of heating it is still necessary either very slowly to heat the preform so as to provide for an equilibrium of the heating or there must be an equilibrium time at the end of the heating operation.

In accordance with this invention, it is proposed to utilize the advantages of both types of heating systems by providing the oven of a blow molding machine with a number of heating units with the heating units being selectively of the different types. Depending upon the arrangement of the heating units and the power levels used, selected heat profiles can be achieved. Further, a more uniform temperature profile can be obtained without the requirement for equilibration time. Further, the use of different types of heating means in sequence permits the use of a closed loop control which can be set up automatically to adjust the heating cycles to provide the desired preform temperature or heat profile at the time it leaves the oven to enter the blow molder.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a sectional view taken through a typical preform formed by an injection molding process.

FIG. 2 is a schematic sectional view taken through a portion of the wall of the preform of FIG. 1, and shows the heat or temperature profile when the preform is heated by quartz or Calrod heaters.

FIG. 3 is a schematic view similar to FIG. 2, and shows the temperature profile through the wall of a preform heated utilizing radio frequency or microwave heating means.

FIGS. 4A, 4B and 4C are schematic sectional views showing the temperature profile through the preform wall when radio frequency heat is utilized and the heat is allowed to equilibrate.

FIGS. 5A, 5B and 5C are schematic sectional views showing the temperature profile through a preform wall when the preform is reheated utilizing radio frequency heating over a long period of time and with a lower power.

FIGS. 6A, 6B and 6C are schematic sectional views through a preform wall when heated utilizing a quartz heater and allowed to equilibrate over a period of time.

FIG. 7A is a schematic sectional view showing a preform wall when heated utilizing a radio frequency heating means.

FIG. 7B is a schematic sectional view of the preform wall of FIG. 7A showing in dotted lines the prior application of heat by radio frequency heater means and with superimposed heating by quartz heater means.

FIG. 7C is a schematic sectional view showing the preform wall of FIGS. 7A and 7B with an equilibration of the heating at two different temperature profiles.

FIGS. 8–12 are schematic layout views showing different feasible combinations of the several types of heating means.

Referring now to the drawings in detail, it will be seen that there is illustrated in FIG. 1 a typical preform 20 which is to be reheated in the formation by a blow molding operation of a bottle having a threaded neck finish 22. The preform 20 will be supported by suitable carrier means (not shown) in a conventional manner which normally engages the neck finish 22 and serves to move the preform 20 along a straightline path through suitable oven means. At this time it is to be understood that the preform 20 is only a typical example of preforms which may be reheated prior to a blow molding operation, and this invention is in no way restricted to the reheating of preforms of the type shown in FIG. 1.

It has been found that when the preform 20 or like preforms are heated utilizing a convection/conduction type heater such as a Calrod or quartz heater, the heating of the preform 20 is primarily from the exterior surface of the wall thereof and, as shown in FIG. 2, the resultant heat or temperature profile is higher at the exterior surface of the preform wall than at the interior surface. The thus heated preform may have a more equal or flatter temperature profile by permitting the temperature to equilibrate. On the other hand, if the heating time is increased and the heating source power is reduced, the temperature profile curve 24 will be flatter. From a practical standpoint, both the equilibration time and the slower heating time is not economically desirable.

Referring now to FIG. 3, it will be seen that there is schematically illustrated a temperature profile 26 through the wall of the preform 20 when the preform has been heated by way of radio frequency (rf) heating or microwave heating. Because of the peculiarities of these types of heating, the interior surface of the preform wall is heated to a higher temperature than the exterior surface. However, when the preform is heated utilizing rf or microwave heating means and an economically feasible heating time is utilized without an equilibration time, the resultant temperature profile 26 is undesirable.

Referring now to FIGS. 4A-4C, it will be seen that when the preform 20 is heated utilizing rf heating means, as pointed out with respect to FIG. 3, the resultant temperature profile 28 is undesirable. However, if the thus heated preform is permitted to have the temperature equilibrate over a period of time, the temperature profile 28 will gradually change to the profile 30 in FIG. 4B and finally to the relatively flat profile 32 of FIG. 4C. While the temperature profile 32 is that desired by a blow molding operation with respect to a cylindrical wall, the elapsed time to obtain the temperature profile 32 is undesirable.

Referring now to FIG. 5A, it will be seen that there is shown a heated preform 20 which has been heated through the use of an rf heater and wherein a temperature profile 34 similar to the profile 28 but much flatter than the profile 28 may be obtained. It is to be understood that the heating time for the temperature profile 34 is much greater than that required to obtain the temperature profile 28. The temperature profile 34 is still not that desired, and time must be provided to permit the temperature to equilibrate with the temperature profile gradually changing to the temperature profile 36 of FIG. 5B, and finally to the temperature profile 38 in FIG. 5C, the temperature profile 38 corresponding generally to the temperature profile 32.

The heating and equilibration process of FIGS. 5A-5C requires a longer time period than that of FIGS. 4A-4C. However, the heating time can only be reduced to a certain point wherein the greater power provided for the rf heater will result in the interior surface of the preform 20 overheating, causing crystallinity and ultimate spoilage. Accordingly, there is a limit as to the minimal heating time premissible utilizing an rf heater.

Referring now to FIGS. 6A-6C, it will be seen that in FIG. 6A there is illustrated a section of the wall of the preform 20 which has been heated utilizing a quartz heater. A temperature profile 40 shows that the exterior surface of the preform wall is undesirably heated to a higher temperature than the interior surface. Further, the temperature gradient is too great.

The thus heated preform of FIG. 6A is permitted to have the temperature thereof equilibrate with the temperature profile 40 changing to the profile 42 of FIG. 6B, and finally to the temperature profile 44 of FIG. 6C. The preform 20 is now ready for presentation to the blow molder.

The same difficulties are encountered utilizing quartz heaters as are encountered using rf heaters. If the heating rate is too high, then the temperature of the exterior surface of the preform 20 will rise to a point where crystallization will occur with resultant preform spoilage. On the other hand, if the power input to the quartz heater is increased too high, the exterior surface of the preform 20 will crystallize with resultant spoilage.

In accordance with this invention, it is proposed to utilize the combination of what may be considered internal and external heating. For example, as shown in FIG. 7A, the preform 20 may be first heated utilizing either rf or microwave heating means to obtain the temperature profile 28 as shown in FIG. 4A, or even a modification thereof as shown in FIG. 5A. Thereafter, the preform 20 will be subjected to further heating such as by way of a quartz heater so as to impress upon the already partially heated preform a temperature profile corresponding generally to the temperature profile 40. Thus, the wall of the preform 20 is first more highly heated at the interior surface thereof and then is heated more highly at the exterior surface thereof. With proper control of the temperature profiles, a desired temperature profile 46, as shown in FIG. 7C, may be obtained with a minimum of time lapse and a minimum oven length.

It is to be understood that in accordance with this invention numerous combinations of heating cycles may be performed on the same preform. Generally speaking, a convenient oven length is one which would contain three or four heating units. These heating units may be arranged in any preferred sequence. With reference to FIGS. 8-12, the letter A represents heating units of the rf or microwave type, and the letter B represents heating units of the Calrod and quartz type. Further, while FIGS. 8-12 disclose several different sequences of heating units, it is to be understood that the arrangements of FIGS. 8-12 are only a few of those which are commercially feasible.

It is also to be understood that the A units need not all be the same. The same is true of the B units. For example, the rate of heating may be varied among similar types of units so as to provide for the necessary temperature equilibration after heating occurs to produce the preselected temperature profile of which the temperatur profile 46 is only an example. Finally, it is to be understood that suitable sensor means of a conventional type may be positioned to sense the temperature of a preform as it enters the last heating stage and the heat output of the last heating stage may be varied as required to obtain the desired final temperature within a very limited range.

Although it is preferred that the heater unit combinations be primarily rf heaters and quartz heaters, it is to be understood that any desired combination of heaters may be utilized in accordance with this invention without departing from the spirit and scope of the appended claims.

We claim:

1. A hybrid heating system for reheating polymer tubular preforms, said heating system comprising at least one first type heating means for heating preforms in a manner wherein an interior surface of a wall of each preform is heated to a higher temperature than an exterior surface of that wall, and at least one second type of heating means for heating preforms in a manner wherein an exterior surface of a wall of each preform is heated to a higher temperature than an interior surface of that wall, whereby a desired temperature profile through a preform may be obtained, all of said heating means being disposed completely externally of a preform to be heated.

2. A hybrid heating system according to claim 1 wherein said first type of heating means and said second type of heating mens are arranged in series along a path of preform movement.

3. A hybrid heating system according to claim 1 wherein said first type of heating means is of the high frequency dielectric type.

4. A hybrid heating system according to claim 1 wherein said second type of heating means is of the convection/conduction type.

5. A hybrid heating system according to claim 1 wherein said first type of heating means is of the high frequency dielectric type and said second type of heating means is of the convection/conduction type.

6. A hybrid heating system according to claim 1 wherein said first type of heating means is of the high frequency dielectric type selected from radio frequency and microwave types.

7. A hybrid heating system according to claim 1 wherein said second type of heating means is of the convection/conduction type selected from quartz and Calrod heaters.

8. A hybrid heating system according to claim 2 whereby there are at least two of one of said types of heating means.

9. A hybrid heating system according to claim 2 whereby there are at least two of one of said types of heating means, said different types of heating means are arranged in alternating relation.

10. A hybrid heating system according to claim 2 whereby there are at least two of one of said types of heating means, said two of one said types of heating means being in adjacent relation.

11. A method of reheating polymer preforms to a blow molding temperature, said method comprising the steps of sequentially heating each preform with two types of heating means both disposed completely externally of a preform being heated with one of said types of heating means functioning to heat a preform wall interior surface to a higher temperature than the exterior surface of that wall and the other of said types of heating means functioning to heat the preform wall exterior surface to a higher temperature than the interior wall, and the two types of heating systems functioning to provide a selected temperature profile through the preform wall.

12. A method according to claim 11 wherein there are at least two of one of said types of heating means.

13. A method according to claim 11 wherein there are at least two of one of said types of heating means, and said different types of heating means are in alternating relation.

14. A method according to claim 1 wherein there are at least two of one of said types of heating means, and said two of one type of said heating systems being in adjacent relation.

15. A method according to claim 11 wherein one of said types of heating means is of the high frequency dielectric heating type.

16. A method according to claim 11 wherein one of said types of heating means is of the high frequency dielectric heating type selected from radio frequency and microwave.

17. A method according to claim 11 wherein one of said types of heating means is of the convection/conduction type.

18. A method according to claim 11 wherein one of said types of heating means is of the high frequency dielectric heating type selected from quartz heater and Calrod heater types.

* * * * *